(12) United States Patent
Kikuchi

(10) Patent No.: US 7,386,998 B2
(45) Date of Patent: Jun. 17, 2008

(54) METHOD OF MANUFACTURING HOLDER-MOUNTED OPTICAL ELEMENT

(75) Inventor: Kimihiro Kikuchi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 586 days.

(21) Appl. No.: 10/802,170

(22) Filed: Mar. 17, 2004

(65) Prior Publication Data
US 2004/0196521 A1  Oct. 7, 2004

(30) Foreign Application Priority Data
Mar. 25, 2003  (JP)  ............... 2003-081970

(51) Int. Cl.
  C03B 11/08  (2006.01)
  C03C 27/02  (2006.01)
  G02B 7/02  (2006.01)
(52) U.S. Cl. .................. 65/39; 65/36; 65/37; 65/59.4; 65/59.1; 359/819
(58) Field of Classification Search .............. None
  See application file for complete search history.

(56) References Cited

U.S. PATENT DOCUMENTS

| 4,895,585 | A | 1/1990 | Angenent et al. |
| 6,829,109 | B2 * | 12/2004 | Kikuchi ............. 359/819 |
| 6,935,136 | B2 * | 8/2005 | Otsuki et al. ............. 65/39 |
| 2002/0184919 | A1 * | 12/2002 | Otsuki et al. ............. 65/39 |

FOREIGN PATENT DOCUMENTS

| EP | 1329756 A1 * | 7/2003 |
| JP | 03167514 A * | 7/1991 |
| JP | 05066302 A * | 3/1993 |
| JP | 07043575 A * | 2/1995 |
| JP | 08075973 A * | 3/1996 |
| JP | 10104489 A * | 4/1998 |
| JP | 2793433 | 6/1998 |
| JP | 2793433 B2 * | 9/1998 |

OTHER PUBLICATIONS

English Language Translation; Kimihiro Kikuchi et. al., "Method for manufacturing optical element equipped with holder and manufacturing apparatus thereof", Kokoku Patent Application No. 2793433, Published Sep. 3, 1998.*

* cited by examiner

Primary Examiner—Steven P. Griffin
Assistant Examiner—Jason L. Lazorcik
(74) Attorney, Agent, or Firm—Brinks Hofer Gilson & Lione

(57) ABSTRACT

A cylindrical holder material having a thin deformed portion is located in a press forming die. An optical element material is installed inside the holder material and the holder material and the optical element material are heated to their respective softening temperatures, thereby forming a cylindrical holder from the holder material and an optical element from the optical element material by press forming the holder material and the optical element material that have been heated to their respective softening temperatures. Thus, the optical element is integrated inside the holder and the deformed portion of the holder is deformed towards the outside thereof by a pressing force applied by the optical element.

5 Claims, 4 Drawing Sheets

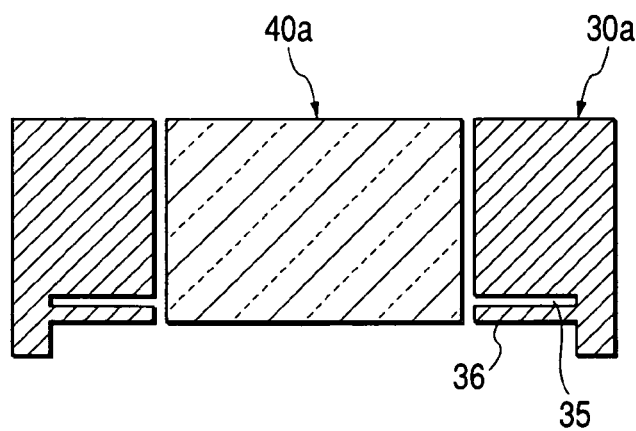
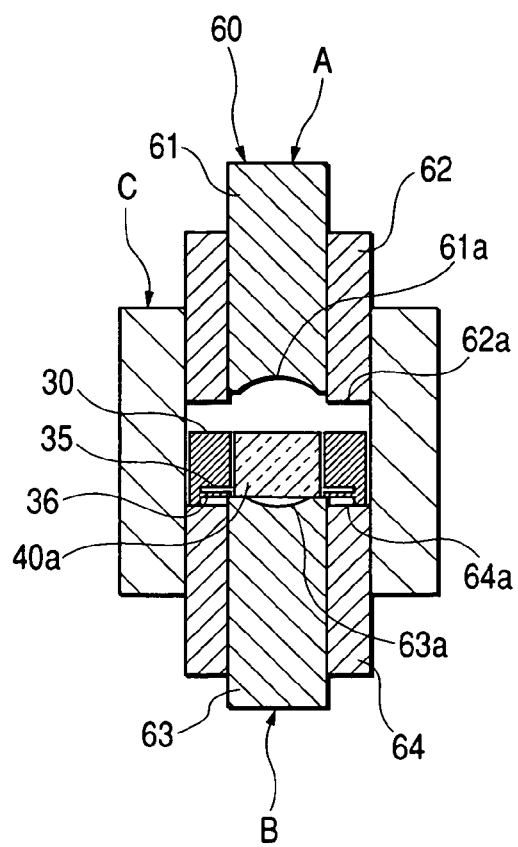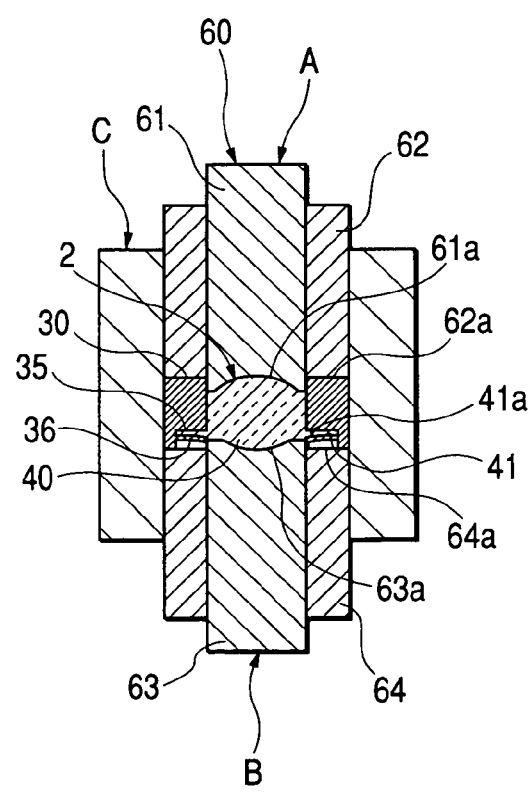

METHOD OF MANUFACTURING HOLDER-MOUNTED OPTICAL ELEMENT

This application claims the benefit of priority to Japanese Patent Application No. 2003-081970, herein incorporated by reference.

BACKGROUND OF THE INVENTION

1. Field of the Invention

The present invention relates to a method of manufacturing a holder-mounted optical element in which a holder and an optical element are integrated, and more particularly, to a method of manufacturing a holder-mounted optical element formed by press forming an optical element material within the holder.

2. Description of the Related Art

An optical element such as lens mounted in a pickup head of a CD player or a lens used in a digital camera requires high precision during its installation. To meet this requirement, a holder-mounted optical element that secures the optical element using a holder is generally manufactured. As a result, it is possible to meet the requirement using the holder. For example, a method of manufacturing the holder-mounted optical element is disclosed in patent document 1. Herein, first, an optical element material is disposed inside a cylindrical holder material and is heated. Then the holder material and the optical element material are press formed using metallic dies, thereby forming the optical element. At the same time, an installation surface for the holder is formed and the optical element is compressed in the holder, thus to integrate the optical element with the holder.

[Patent Document 1]
Japanese Patent No. 2793433 (FIG. 3)

However, when press forming the optical element material, if there is any error in the volumetric metering of the optical element material, the thickness of the optical element material is changed. As a result, optical performance is degraded and an ideal optical location should be obtained for adjustment and fixation, causing problems in terms of performance and location determination. As a method to solve such problems, there is a method that the volume error can be reduced by improving precision in the volumetric metering of the optical element material. However, to make sure to obtain the desired effects, it is necessary to handle not only the volume of the optical element material but also the holder shape with high precision.

SUMMARY OF THE INVENTION

The present invention has been finalized in view of such drawbacks, and it is an object of the present invention to provide a method of manufacturing a high precision holder-mounted optical element that makes it possible to correct for errors in the volumetric metering of the optical element material and reduce error in the holder shape.

To achieve this object, a method of manufacturing a holder-mounted optical element according to the present invention comprises steps of: disposing a cylindrical holder material having a thin deformed portion in a press forming die, providing an optical element material inside the holder material, and heating the holder material and the optical element material to their respective softening temperatures; forming a cylindrical holder from the holder material and an optical element from the optical element material by press forming the holder material and the optical element material that have been heated to their respective softening temperatures; and integrating the optical element inside the holder and deforming the deformed portion of the holder towards the outside by the pressure applied by the optical element.

In addition, in the present invention, reference surfaces for installation of the holder-mounted optical element in an optical axis direction and a radial direction are formed as a holder outer shape by press formation of the holder material.

In addition, in the present invention, a surplus is previously added to a volume required for formation of the optical element in the optical element material, thereby deforming the deformed portion.

In addition, in the present invention, a side of the holder material is made thin and serves as the deformed portion, and the inside of the deformed portion is pressed by the optical element.

In addition, in the present invention, a thin collar portion is formed on the inner circumferential side of the holder and serves as the deformed portion, and a portion near the inside tip portion of the deformed portion is pressed by the optical element.

BRIEF DESCRIPTION OF THE DRAWINGS

FIG. 6 is a sectional view of a lens holder material and a lens material prior to press forming according to the second embodiment of the present invention; and FIG. 7 is a sectional view of a manufacturing state of the holder-mounted optical element according to the second embodiment of the present invention.

DESCRIPTION OF THE PREFERRED EMBODIMENT

Figure 1:
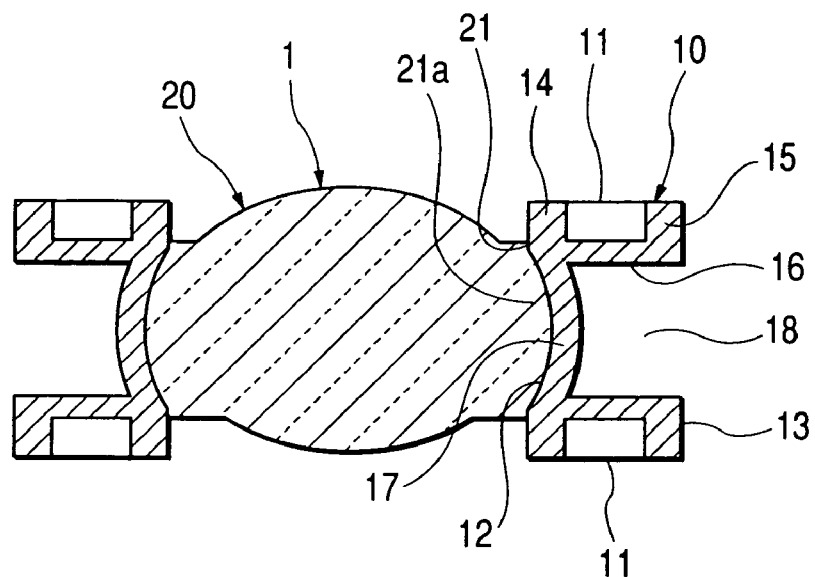
FIG. 1 is a sectional view of a holder-mounted optical element according to a first embodiment of the present invention.
Figure 2:
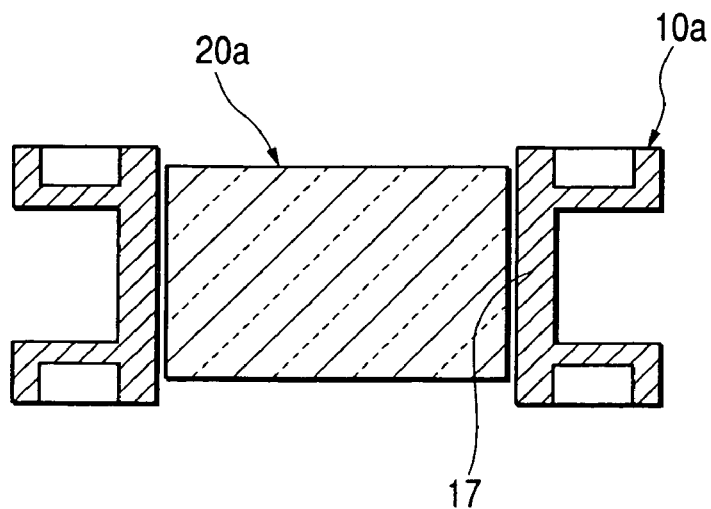
FIG. 2 is a sectional view of a lens holder material and a lens material prior to press forming according to the first embodiment of the present invention.
Figure 3:
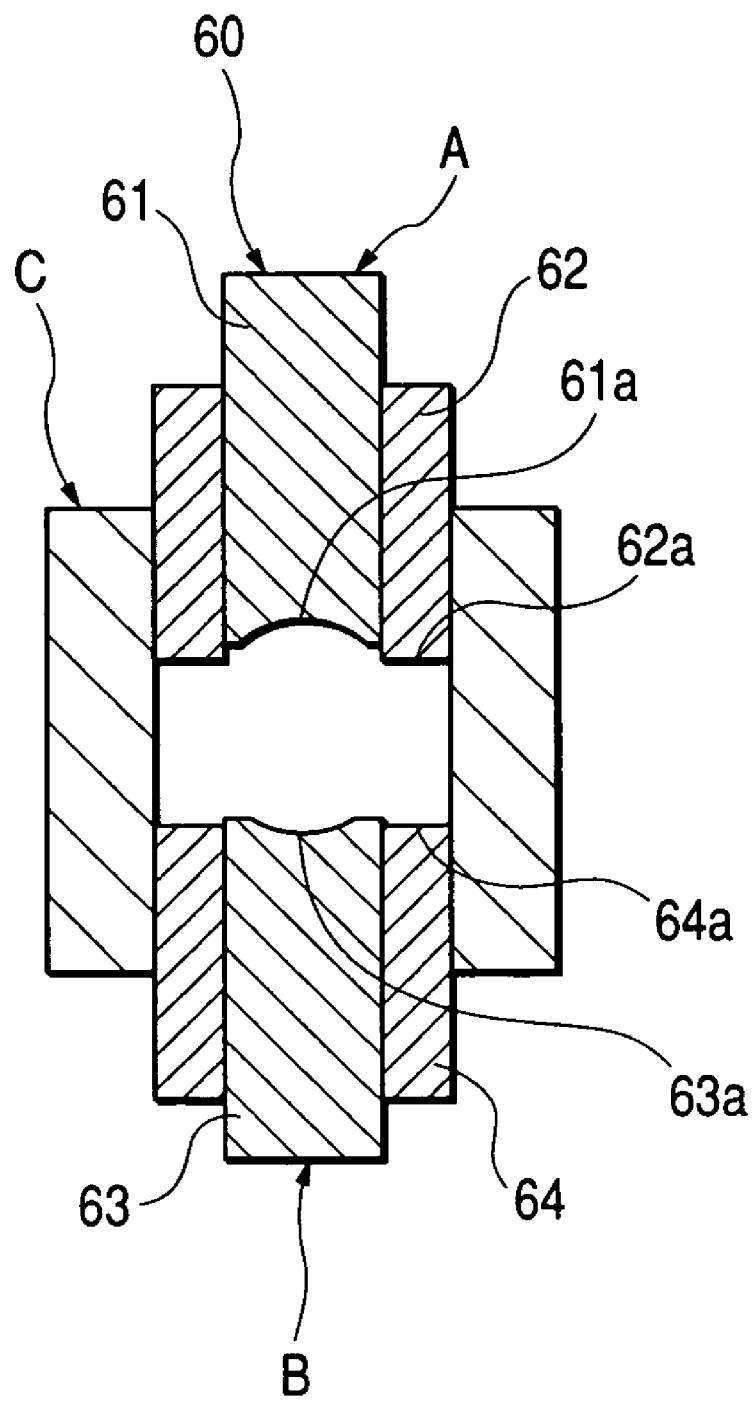
FIG. 3 is a sectional view of a manufacturing device for the holder-mounted optical element according to the first embodiment of the present invention;.

Hereinafter, preferred embodiments of the present invention will be described in detail with reference to the accompanying drawings. FIG. 1 is a sectional view of a holder-mounted optical element according to a first embodiment of the present invention. FIG. 2 is a sectional view of a lens holder material and a lens material prior to press forming according to the first embodiment of the present invention. FIG. 3 is a sectional view of a manufacturing device for the holder-mounted optical element according to the first embodiment of the present invention. FIG. 4 is a sectional view illustrating a manufacturing state of the holder-mounted optical element according to the first embodiment of the present invention.

In this embodiment, a holder-mounted optical element 1 is used for pickup heads of CD players or digital cameras, for example, and, as shown in FIG. 1, includes a cylindrical lens holder 10 and a spherical lens 20 that is accommodated into the lens holder 10.

The lens holder 10 secures the lens 20, is used for location determination of the lens 20 in an optical device, and is formed of aluminum or stainless steel. The lens holder 10 includes attaching surfaces 11 and 11 that serve as reference surfaces of the optical axis direction for the installation into the optical device, an inner circumferential surface 12 that contacts the lens 20, and an outer circumferential surface 13 that serves as the reference surface of the diametric direction for the installation into the optical device. A thin deformed portion 17, which forms a central portion of the inner circumferential surface 12, is formed on the inner circumferential side of the lens holder 10. In addition, continuing from the deformed portion 17, an inner circumferential attaching portion 14, which forms the end portions of the inner circumferential surface 12 and portions of the attaching surfaces 11, is formed. Moreover, at the outer circumferential side of the lens holder 10, an outer circumferential attaching portion 15, which forms the end portions of the outer circumferential surface 13 and portions of the attaching surfaces 11, is formed. The outer circumferential attaching portion 15 continues from the deformed portion 17 through a connecting portion 16 and is surrounded by the deformed portion 17 and the connecting portion 16. Therefore, an outer gap portion 18 is formed at the outer circumferential side of the deformed portion 17.

Here, the lens holder 10 is formed by forming a lens holder material 10a having the deformed portion 17 as shown in FIG. 2 by using a cutting process method or a casting method according to a predetermined measurement precision and then press forming the lens holder material 10a. In this way, by doing final forming of the lens holder 10 using press forming, the lens holder 10 can have higher precision than a lens holder formed by cutting process.

A glass lens 20 is accommodated into the lens holder 10. The both surfaces of the glass lens 20 are convex spherical lens and are formed by press forming a lens material 20a as in FIG. 2. In addition, the glass lens 20 is compressed to the lens holder 10 by the pressure used in press forming and is thus integrated with the lens holder 10. A circumferential portion 21 of the glass lens 20 has a surplus portion 21a that protrudes from the entire surface of the glass lens 20 to outside.

The lens material 20a is composed of an optical glass material. For example, the optical glass material may be lead oxide-based glass material SFS01. Herein, the lens material 20a intentionally has a surplus in addition to the volume required for forming the glass lens 20. Through this structure, any volume error of the conventional lens material 20a is included in the surplus. Subsequently, a volume of the lens material 20a, which is required for forming at least the glass lens 20, can be secured.

Herein, when the lens holder 10 is at the stage of the lens holder material 10a that is formed by a cutting process prior to press forming, the transforming portion 17 as shown in FIG. 2 is formed nearly vertically with respect to the attaching surfaces 11 and 11. However, by the forming pressure applied when the glass lens 20 is press-formed, the surplus of the lens material 20a expands and applies pressure to the deformed portion 17 towards the outside of the radial direction. In addition, the lens holder material 10a is press formed. As a result, the deformed portion 17 is deformed into an upside down shape towards the outside of the radial direction, i.e., towards the outer gap portion 18. In addition, through the deformation of the deformed portion 17, the surplus of the lens material 20a is entirely accommodated into a space formed inside of the deformed portion 17. In other words, the surplus of the lens material 20a, which corresponds to the volume unnecessary to the formation of the glass lens 20, and the volume error are absorbed by the deformation of the deformed portion 17. Through such absorption, it is possible to form a high-precision glass lens 20 having the desired shape.

However, if the deformed portion 17 has high rigidity, it is difficult to transform the deformed portion 17 and then it is impossible to transform the deformed portion 17 by a pressing force applied to the surplus of the lens material 20a and the forming press with respect to the lens holder material 10a. As a result, the surplus becomes an error in forming the glass lens 20. In contrast, if the deformed portion 17 has low rigidity, it is easily deformed by the forming press with respect to the lens holder material 10a and the pressure applied to the lens material 20a in the application of the forming press. As a result, the deformed portion 17 is deformed more than what is required for absorbing the surplus. In addition, if the rigidity is low, the shape of the lens holder 10 cannot be maintained. In other words, the deformed portion 17 should have the rigidity that allows a portion necessary for absorbing the surplus of the lens material 20a to be deformed but prevents other portions from being deformed. By selecting a thickness and a material that satisfy the above conditions for the rigidity of the deformed portion 17, the deformed portion 17 can function more effectively.

Next, a manufacturing device 60 for manufacturing the holder-mounted optical element 1 will be described. As shown in FIG. 3, the manufacturing device 60 includes an upper die A, a lower die B, and an outer diameter die C. The upper die A includes an upper inner die 61 and an upper outer die 62, and the lower die B, which is located under the upper die A, includes an lower inner die 63 and an lower outer die 64. In addition, the outer diameter die C is provided to surround the upper die A and the lower die B.

The upper inner die 61 and the lower inner die 63 are formed in circumferential shapes. Lens transfer surfaces 61a and 63a forming spherical lens surfaces are formed in the lower end portion of the upper inner die 61 and the upper end portion of the lower inner die 63, respectively. On the other hand, the upper outer die 62 and the lower outer die 64 are positioned on outer circumferential sides of the upper inner die 61 and lower inner die 63, respectively. The upper outer die 62 and the lower outer die 64 are formed in a substantially cylindrical shape. Holder forming surfaces 62a and 64a forming the attaching surfaces of the lens holder 10 is formed in the lower end portion of the upper outer die 62 and the upper end portion of the lower outer die 64. The thicknesses of the upper outer die 62 and the lower outer die 64 are approximately equal to that of the lens holder 10 described above, and the inner circumference of the outer diameter die C is approximately equal to the outer diameter of the lens holder 10.

In addition, the upper inner die 61 and the upper outer die 62 may slide independently in a vertical direction by a driving mechanism (not shown). In the meantime, the lower inner die 63 and the lower outer die 64 are fixed, but they may be slid in a vertical direction.

Figure 4A:
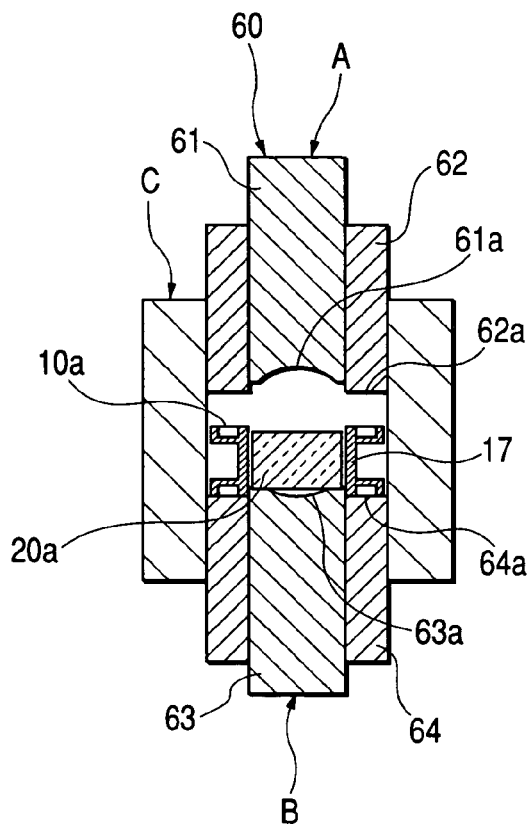
FIG. 4 is a sectional view illustrating a manufacturing state of the holder-mounted optical element according to the first embodiment of the present invention.

Hereinafter, a process of manufacturing the holder-mounted optical element 1 using the manufacturing device 60 will be described. First, as shown in FIG. 4A, the lens holder material 10a is relocated on the holder forming surface 64a of the lower outer die 64. The lens holder material 10a has been previously processed into a tube shape with a predetermined measurement precision. In addition, the lens material 20a is relocated inside the lens holder material 10a.

Herein, although not shown in FIG. 4, a heating member faces the outer circumference of the lens holder material 10a, and the lens holder material 10a is heated by the heating member up to its softening temperature. In addition, the lower inner die 63 and the lower outer die 64 are also heated through heating of the lens holder material 10a.

In the meantime, the lens material 20a is heated by radiant heat of the lower outer die 64 and transferred heat and radiant heat of the lower inner die 63 and the lens material 20a. At this time, the temperature of the lens material 20a is about 30° C. lower than softening temperature of the lens holder material 10a and serves as softening temperature of the lens material 20a, which approximates to a glass transition point between the glass transition point and a glass softening point.

In other words, the lens material 20a that is most suitable for the purpose of use is selected and the optimal temperature for press forming is set within a range between the glass transition point of the lens material 20a and the glass softening point of the lens material 20a. As a result, the material of the lens holder material 10a having the optimal softening temperature for the lens material 20a is determined. That is, to heat the lens material 20a to a predetermined temperature between the glass transition point and the glass softening point, conditions for selecting the material of the lens holder material 10a should be based on whether softening temperature is about 30° C. higher than the predetermined temperature.

Figure 4B:
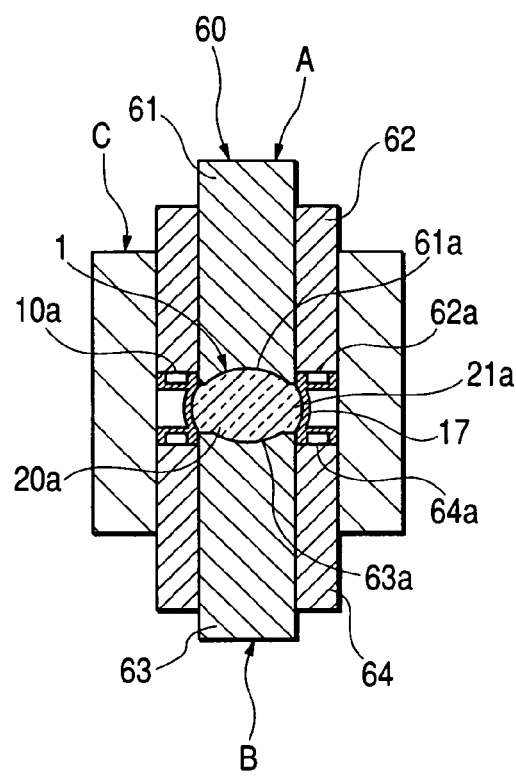

Once the lens holder material 10a and the lens material 20a are heated to their respective softening temperatures, as shown in FIG. 4B, press forming is performed on the lens holder material 10a and the lens material 20a. More specifically, the upper inner die 61 and the upper outer die 62 are moved downward by the driving mechanism. Through this movement, the lens holder material 10a on the lower outer die 64 is shape-transferred by the holder forming surface 62a of the upper outer die 62 and the holder forming surface 64a of the lower outer die 64. In other words, the attaching surfaces 11 and 11, which serve as the reference surfaces of the optical axis direction for the installation of the optical device, are formed by the holder forming surfaces 62a and 64a.

Further, at this time, the inner circumferential attaching portion 14 shrinks due to the forming pressure from the upper outer die 62 and the lower outer die 64 in a compression direction in the side of the inner circumference of the lens holder material 10a. At the same time, the deformed portion 17 is deformed towards the outside of the radial direction. On the side of the outer circumference, the connecting portion 16 and the outer circumferential attaching portion 15 are bent in the compression direction. In this way, the lens holder material 10a stops application of the forming pressure of the upper outer die 62 and the lower outer die 64 without waste.

In addition, the lens material 20a is transferred into the outline shape of the lens 20 by the lens transfer surface 61a of the upper inner die 61 and the lens transfer surface 63a of the lower inner die 63. Herein, since the lens 20 is press formed simultaneously with the lens holder 10, the location relationship among the attaching surfaces 11 and 11 as the reference surfaces formed on the lens holder 10, the outer circumferential surface 13, and the lens 20 is established to meet design values with high precision. In addition, the axis of the lens holder 10 and the optical axis direction of the lens 20 are formed to meet the design values with high precision.

Moreover, when the lens material 20a is press formed and is subjected to pressure, the surplus of the lens material 20a expands and applies pressure the deformed portion 17 of the lens holder 10 towards the outside of the radial direction by the forming pressure. Thus, the surplus of the lens material 20a entirely is accommodated into the space formed inside of the deformed portion 17 and becomes the surplus portion 21a described above. Herein, since the deformed portion 17 is deformed to some extents towards the outside of the radial direction by the forming pressure applied to the lens holder material 10a by the upper outer die 62 and the lower outer die 64, the deformed portion 17 is deformed by the pressure applied to the surplus of the lens material 20a such that the surplus of the lens material 20a entirely is accommodated into the space formed inside of the deformed portion 17.

In addition, since the deformed portion 17 is deformed into the upside down shape towards the outside of the radial direction, the outer circumferential attaching portion 15 continuing from the deformed portion 17 through the connecting portion 16 also moves towards the outside of the radial direction. Thus, the outer circumferential attaching portion 15 applies pressure to the outer diameter die C. In this way, the outer circumferential surface 13 is formed as the reference surface of the diametric direction for the installation into the optical device.

Figure 5:
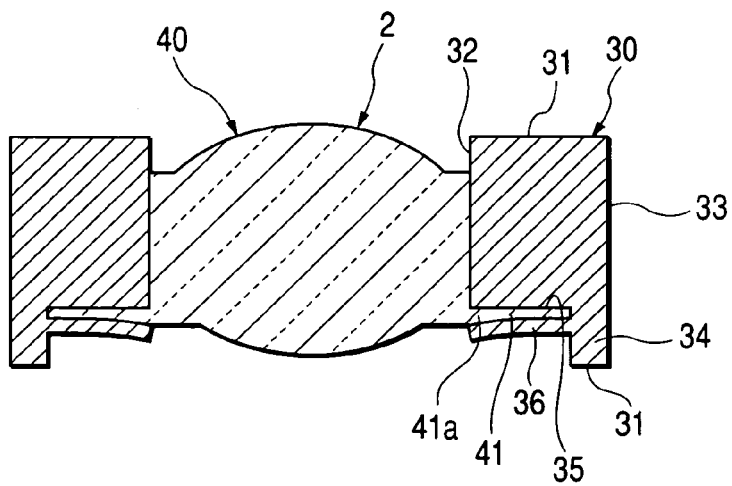
FIG. 5 is a sectional view of a holder-mounted optical element according to a second embodiment of the present invention.

The above is the explanation of the first embodiment of the present invention. Hereinafter, a second embodiment of the present invention will be described. FIG. 5 is a sectional view of a holder-mounted optical element according to the second embodiment of the present invention. FIG. 6 is a sectional view of a lens holder material and a lens material prior to press forming according to the second embodiment of the present invention. FIG. 7 is a sectional view of a manufacturing state of the holder-mounted optical element according to the second embodiment of the present invention.

In this embodiment, a holder-mounted optical element 2 is used in pickup heads of CD players or digital cameras as in the first embodiment of the present invention. As shown in FIG. 5, the holder-mounted optical element 2 is composed of a cylindrical lens holder 30 and a spherical lens 40 that is accommodated into the lens holder 30.

The lens holder 30 is formed of aluminum or stainless steel and includes attaching surfaces 31 and 31, an inner circumferential surface 32, and an outer circumferential surface 33. One of the attaching surfaces 31 is formed by an outer circumferential attaching portion 34 formed in a convex shape on the outer circumferential side. A filling groove 35 is formed in the location that is approximately similar to one lens surface of the lens 40 in the inner circumferential side of the outer circumferential attaching portion 34, thereby forming a thin collar portion 36. The tip portion of the collar portion 36 is upside down towards outside. The lens holder 30 is formed by press forming a lens holder material 30a with a predetermined precision by a cutting process method or casting method, as shown in FIG. 6.

A glass lens 40 is accommodated into the lens holder 30. The both surfaces of the lens 40 are spherical convex lenses and the lens 40 is formed by press forming the lens material 40a shown in FIG. 6. In addition, the lens 40 is compressed to the lens holder 30 by the pressure applied in press forming and is thus integrated with the lens holder 30. The lens 40 has a filling convex portion 41, which is accommodated into the above-described filling groove 35, in part of an outer circumferential portion. Moreover, a surplus portion 41*a* is formed around the tip portion of the collar portion 36 of the filling groove 35.

The lens material 40*a* intentionally has a surplus in addition to the volume of material that is required for forming the lens 40, similarly to the first embodiment of the present invention. Further, in this embodiment, the volume of material that is required for forming the lens 40 includes a filling convex portion 41.

Herein, in an initial state where the lens holder 30 is formed through a cutting process, the collar portion 36 is formed in a plane shape as shown in, FIG. 6. However, the lens material 40*a* is filled into the filling groove 35 due to the forming pressure applied when the lens 40 is press formed. Further, the surplus of the lens material 40*a* inside the filling groove 35 presses the collar portion 36 from the inside to the outside. As a result, the tip portion of the collar portion 36 is bent towards the outside and expands the filling groove 35. The surplus of the lens material 40*a* entirely is accommodated into the expanded portion of the filling groove 35. Thus, the surplus, which is the volume not required for forming the lens 40 in the lens material 40*a*, and the volume error are absorbed by the deformation of the collar portion 36. As a result, it becomes possible to form the high-precision lens 40 having the desired shape. In addition, the requirement for rigidity of the collar portion 36 is the same as in the first embodiment of the present invention.

Hereinafter, a process of manufacturing the holder-mounted optical element 2 will be described. The manufacturing device 60 is identical to that of the first embodiment of the present invention and description thereof will be omitted. First, the lens holder material 30*a* is relocated on a holder forming side 64*a* of the lower outer die 64. Further, the lens material 40*a* is relocated inside the lens holder material 30*a* (FIG. 7A). At this time, the lens holder material 30*a* relocates the side having the collar portion 36 towards the lower outer die 64.

After that, the lens holder material 30*a* and the lens material 40*a* are heated. Once the lens holder material 30*a* and the lens material 40*a* are heated up to their respective softening temperatures, press forming is performed on the lens holder material 30*a* and the lens material 40*a* (FIG. 7B). As a result, the attaching surfaces 31 and 31 and the outer circumferential surface 33 are formed in the lens holder material 30*a*. In addition, the lens 40 is formed.

Once pressure is applied to the lens material 40*a*, the lens material 40*a* is filled into the filling groove 35 due to the forming pressure. Moreover, the surplus of the lens material 40*a* expands and applies pressure to the collar portion 36 from the inside of the filling groove 35 towards the outside of the filling groove 35. The surplus of the lens material 40*a* is accommodated into the expanded portion of the filling groove 35 formed by the deformation and becomes the surplus portion 41*a*.

The above are the descriptions of the first and second embodiments of the present invention. In the above embodiments, a method of manufacturing a spherical convex lens is explained. However, the present invention is not limited to a lens having the shape as described above and the lens may be a concave lens or take other forms. In addition, the present invention is not limited to the lens, but may be applied to a method of manufacturing a holder-mounted optical element such as an optical element where a diffraction lattice is accommodated into a holder and is integrated with the holder.

According to the present invention, a cylindrical holder material having a thin deformed portion is disposed in a press forming die, an optical element material is provided inside the holder material, and the holder material and the optical element material are heated to their respective softening temperatures and are then press formed separately. Since the a cylindrical holder is formed from the holder material and an optical element is formed from the optical element material in this way, it is possible to manufacture a holder whose precision is higher than that of a holder formed by a cutting process.

In addition, by press forming the holder and the optical element at the same time, the optical element is integrated with the holder within the holder. Therefore, it is possible to meet the design values of the location relationship between the holder and the optical element with high precision. As a result, location adjustment becomes unnecessary during installation of the optical device.

Moreover, since the deformed portion of the holder is deformed towards the outside due to the forming pressure of the optical element, any error in volumetric metering of the optical element material is absorbed by the deformation of the deformed portion at the time of forming the optical element. Therefore, it is possible to manufacture a holder-mounted optical element having an optical element of the desired shape with high forming precision.

What is claimed is:

1. A method of manufacturing a holder-mounted optical element, comprising:
    disposing cylindrical holder material in a press forming die, the cylindrical holder material having a thin deformable portion;
    providing an optical element material comprising an initial volume of the optical element material and a surplus volume of the optical element material inside the cylindrical holder material;
    heating the cylindrical holder material, the initial volume of the optical element material, and the surplus volume of the optical element material, to their respective softening temperatures;
    press forming the cylindrical holder material, the initial volume of the optical element material and the surplus volume of the optical element material;
    the press forming configured to form a cylindrical holder from the cylindrical holder material, and configured to form an optical element from the optical element material;
    the press forming configured to integrate the optical element inside the cylindrical holder by applying a pressing force to the optical element material to cause the optical element material to expand outwardly in a convex shape and deform the deformable portion; and
    wherein the deformable portion is configured to receive a second volume of optical element material that is equivalent in volume to the surplus volume of the optical element material so that the optical element contains a first volume of optical element material that is equivalent in volume to the initial volume of the optical element material.

2. The method of manufacturing a holder-mounted optical element according to claim 1,
    wherein reference surfaces for installation of the holder-mounted optical element in an optical axis direction and a radial direction are formed as a holder outer shape by press formation of the holder material.

3. The method of manufacturing a holder-mounted optical element according to claim 1, wherein the surplus volume of the optical material is previously added in a precision manner to the initial volume of the optical material required for formation of the optical element.

4. The method of manufacturing a holder-mounted optical element according to claim 1, wherein a side portion of the holder material is made thin and is deformable, and an inside portion of the deformable portion is deformed outwardly by the optical element material under pressure.

5. The method of manufacturing a holder-mounted optical element according to claim 1, wherein a thin collar portion is formed on an inner circumferential side of the holder and serves as the deformable portion, and a portion near an inside tip portion of the deformable portion is pressed by the optical element material.

* * * * *